US009579795B2

(12) United States Patent
Kokubo et al.

(10) Patent No.: US 9,579,795 B2
(45) Date of Patent: Feb. 28, 2017

(54) ROBOT DEVICE, METHOD OF CONTROLLING THE SAME, AND PROGRAM FOR CONTROLLING THE SAME

(75) Inventors: Wataru Kokubo, Tokyo (JP); Tetsuharu Fukushima, Tokyo (JP); Masakuni Nagano, Chiba (JP); Satoru Shimizu, Tokyo (JP)

(73) Assignee: Sony Corporation, Tokyo (JP)

( * ) Notice: Subject to any disclaimer, the term of this patent is extended or adjusted under 35 U.S.C. 154(b) by 590 days.

(21) Appl. No.: 13/456,489

(22) Filed: Apr. 26, 2012

(65) Prior Publication Data

US 2012/0290132 A1   Nov. 15, 2012

(30) Foreign Application Priority Data

May 10, 2011   (JP) .................................. 2011-105514

(51) Int. Cl.
G05B 19/04   (2006.01)
G05B 19/18   (2006.01)
B25J 9/16   (2006.01)

(52) U.S. Cl.
CPC ... B25J 9/1666 (2013.01); *G05B 2219/40298* (2013.01); *G05B 2219/40475* (2013.01)

(58) Field of Classification Search
CPC ...... B25J 9/1666; B25J 9/0003; B25J 9/1664; B25J 9/1676; B25J 9/1674; G06N 3/008
USPC .................................................. 700/245–264
See application file for complete search history.

(56) References Cited

U.S. PATENT DOCUMENTS

| 4,679,034 A * | 7/1987 | Kamada ................. G08B 13/19 340/529 |
| 5,758,298 A * | 5/1998 | Guldner ................ G01S 15/931 318/580 |
| 8,442,714 B2 * | 5/2013 | Matsukawa et al. ........... 701/26 |
| 2004/0236469 A1 * | 11/2004 | Moridaira .............. B25J 9/1674 700/245 |
| 2006/0173577 A1 * | 8/2006 | Takeda .................. G06T 7/0042 700/245 |
| 2007/0276553 A1 * | 11/2007 | Bitar .................... G01C 21/005 701/3 |
| 2008/0021597 A1 * | 1/2008 | Merte ...................... F16P 3/14 700/255 |
| 2008/0039984 A1 * | 2/2008 | Bitar ...................... G01C 21/20 701/3 |
| 2008/0174454 A1 * | 7/2008 | Bitar ...................... G01C 23/00 340/975 |
| 2009/0157241 A1 * | 6/2009 | Meunier ................. G01S 13/94 701/9 |
| 2009/0171505 A1 * | 7/2009 | Okazaki ................ B25J 9/1676 700/258 |
| 2010/0010694 A1 * | 1/2010 | Johnson ............... G01C 23/005 701/9 |

(Continued)

FOREIGN PATENT DOCUMENTS

JP   6-63882   3/1994

*Primary Examiner* — Harry Oh
(74) *Attorney, Agent, or Firm* — Chip Law Group

(57) ABSTRACT

Provided is a robot device including a drive unit including a plurality of links and joints connecting the links, a task instruction input unit for inputting an instruction of a task, a drive control unit for controlling an operation of the drive unit on the basis of the input task and determining a restricted area including a space necessary for the operation of the drive unit, and an area display unit for displaying the restricted area.

11 Claims, 8 Drawing Sheets

(56) References Cited

U.S. PATENT DOCUMENTS

| | | | |
|---|---|---|---|
| 2010/0030379 A1* | 2/2010 | Parlantzas | B25J 9/0003 700/253 |
| 2010/0152932 A1* | 6/2010 | Das | G01C 23/00 701/14 |
| 2010/0161126 A1* | 6/2010 | Goswami | B62D 57/032 700/255 |
| 2010/0191373 A1* | 7/2010 | Kim | G06N 3/008 700/250 |
| 2011/0010023 A1* | 1/2011 | Kunzig | G01S 5/16 701/2 |
| 2011/0037963 A1* | 2/2011 | Weiss | G01S 7/4817 356/3.1 |
| 2011/0054689 A1* | 3/2011 | Nielsen | G05D 1/0088 700/258 |
| 2011/0093134 A1* | 4/2011 | Emanuel | G05D 1/0289 701/2 |
| 2011/0093191 A1* | 4/2011 | Trovato | G06Q 10/047 701/533 |
| 2011/0190972 A1* | 8/2011 | Timmons | G01C 21/34 701/31.4 |
| 2011/0270444 A1* | 11/2011 | Nagata | G05B 19/401 700/258 |
| 2011/0273292 A1* | 11/2011 | Hayashide | G08B 29/18 340/555 |

* cited by examiner

ROBOT DEVICE 100

ROBOT DEVICE, METHOD OF CONTROLLING THE SAME, AND PROGRAM FOR CONTROLLING THE SAME

BACKGROUND

The present technology disclosed in this specification relates to a robot device, which communicates with humans and the like (including adults, children, and pets) within a home environment, a method of controlling the same, and a program for controlling the same, and more particularly to a robot device, which takes appropriate safety measures for humans and the like, a method of controlling the same, and a program for controlling the same.

Demands for mechatronic devices such as household robots designed to do household chores, care, or the like for humans are increasing. These robots communicate with the humans and the like (including adults, children, and pets) within home environments. In the future, the robots are predicted to be deeply rooted in dwelling spaces of humans. In combination with this, there is an urgent need to secure the safety of robots that operate in the dwelling spaces.

In the case of industrial robots, general practice is to completely prevent contact with humans and secure the safety by installing barriers on the outsides of work areas corresponding to all movable ranges of the robots. Further, a sensor, which detects the entry of a human and the like, may be installed in a barrier and safety measures may be taken to cause the robot to be in an emergency stop state when entry has been sensed.

On the other hand, in the case of household robots, if a barrier is installed on the outside of a work area, a movable range would be the entire living room, and thus humans would be unable to live in a living room. In addition, it is difficult to surround all work areas with barriers because the household robots work in physical contact with the humans.

In addition, the industrial robot is designed so that the human does not approach the robot by causing a warning sound or a warning lamp to constantly operate during movement. For example, an industrial robot, which generates a warning sound according to a manipulator-selected speed, has been proposed (for example, see Japanese Patent Application Laid-Open No. 6-63882). Alternatively, safety measures may be taken by performing an emergency stop when a human or obstacle approaches within a predetermined distance by installing a distance sensor, which senses the human or obstacle, in the robot.

However, if the household robot constantly operates the warning sound or the warning lamp regardless of a degree of interference to a task of the robot, a user may not live calmly due to noisiness in the same environment. In addition, it is difficult to implement tasks such as household chores or care according to physical contact if the emergency stop is performed when a human or obstacle approaches within a predetermined distance.

SUMMARY

It is desirable to provide an excellent robot device, a method of controlling the same, and a program for controlling the same, which can enable appropriate safety measures to be taken for a human and the like in a home environment.

According to an embodiment of the present technology, there is provided a robot device including: a drive unit including a plurality of links and joints connecting the links; a task instruction input unit for inputting an instruction of a task; a drive control unit for controlling an operation of the drive unit on the basis of the input task and determining a restricted area including a space necessary for the operation of the drive unit; and an area display unit for displaying the restricted area.

In the robot device according to another embodiment of the present technology, the drive control unit predicts a space necessary for a predetermined time so as to implement the input task, and determines the restricted area based on the prediction result.

In the robot device according to another embodiment of the present technology, the drive unit is configured to further include a moving unit for moving a position of the robot device. The drive control unit is configured to predict a space necessary at a moving position at each time until the predetermined time has elapsed, and determine the restricted area based on a prediction result.

According to another embodiment of the present technology, the robot device further includes: a recognition unit for recognizing a human or obstacle within a work environment. The area display unit is configured to display the restricted area when the human or obstacle recognized by the recognition unit is located within the restricted area.

According to another embodiment of the present technology, the robot device further includes: a recognition unit for recognizing a human or obstacle within a work environment. The drive control unit is configured to cause the drive unit to operate on the basis of the input task until after a certain time has elapsed when the human or obstacle recognized by the recognition unit is not located within the restricted area.

According to another embodiment of the present technology, the robot device further includes: a recognition unit for recognizing a human or animal within a work environment; and a warning unit for issuing a warning so that the human or animal recognized by the recognition unit leaves the restricted area when the human or animal is located within the restricted area.

In the robot device according to another embodiment of the present technology, the warning unit is configured to issue the warning using one of a message audio output, blank shot, smell, and hot air or a combination of two or more thereof.

According to another embodiment of the present technology, there is provided a method of controlling a robot device, including: inputting an instruction of a task; controlling an operation of a drive unit, of the robot device, including a plurality of links and joints connecting the links on the basis of the input task; determining a restricted area including a space necessary for the operation of the drive unit; and displaying the restricted area.

According to another embodiment of the present technology, there is provided a robot device control program for causing a robot device to be driven as: a drive unit, of the robot device, including a plurality of links and joints connecting the links; a task instruction input unit for inputting an instruction of a task; a drive control unit for controlling an operation of the drive unit on the basis of the input task and determining a restricted area including a space necessary for the operation of the drive unit; and an area display unit for displaying the restricted area.

According to the embodiments of the present disclosure described above, it is possible to provide an excellent robot device, a method of controlling the same, and a program for controlling the same, which can enable appropriate safety measures to be taken for a human and the like in a home environment.

The robot device disclosed in this specification is configured to detect the existence of a human or the like, determine whether or not the action of the human or the like interferes with task execution of the robot device, specify a restricted area when the interference is determined to be present, and issue a warning. Its advantageous effects are as follows.

(1) A household robot that executes a task according to an instruction can take appropriate safety measures within a home environment.

(2) It is possible to specify a subsequent restricted area predicted for every task and urge a human or the like to move.

(3) It is possible to narrow down the restricted area to an appropriate restricted area by adjusting a predetermined time for every task.

(4) It is possible to guide a human or the like entering the restricted area outside the area through a warning.

(5) It is possible to enable a task to be seamlessly continued by physically guiding a human's approach.

(6) Because a specified restricted area can be limited only to a dangerous area of a task to be currently executed, an influence of the restricted area on a home environment is reduced.

Other objects, features and advantages of the present disclosure will become more apparent from the following further detailed description of embodiments of the present disclosure taken in conjunction with the accompanying drawings.

DETAILED DESCRIPTION OF THE EMBODIMENT(S)

Figure 1:
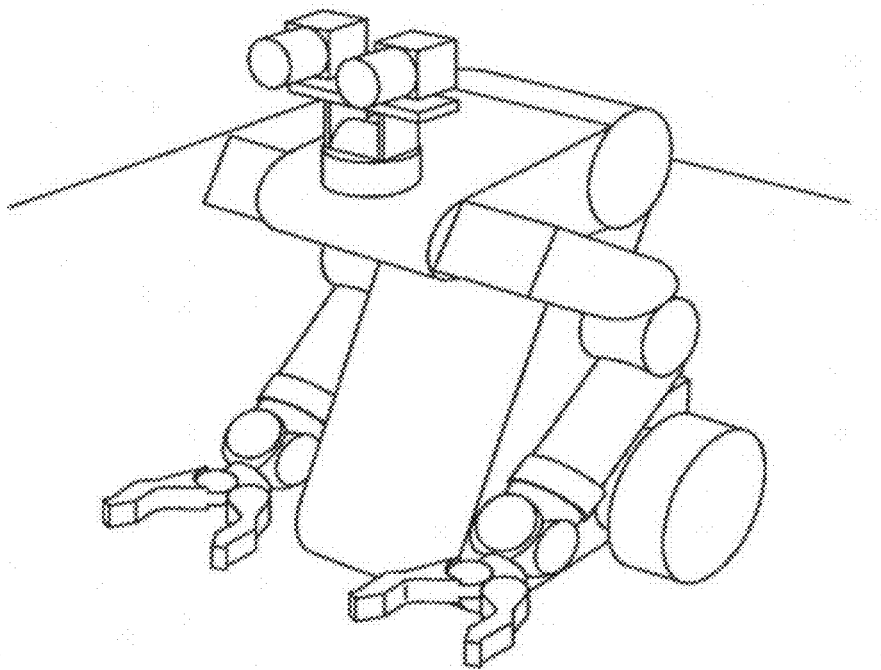
FIG. 1 is a diagram illustrating the external appearance of a robot device 100 to which the present technology disclosed in this specification is applicable.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments of the present disclosure will be described with reference to the drawings.

Figure 2:
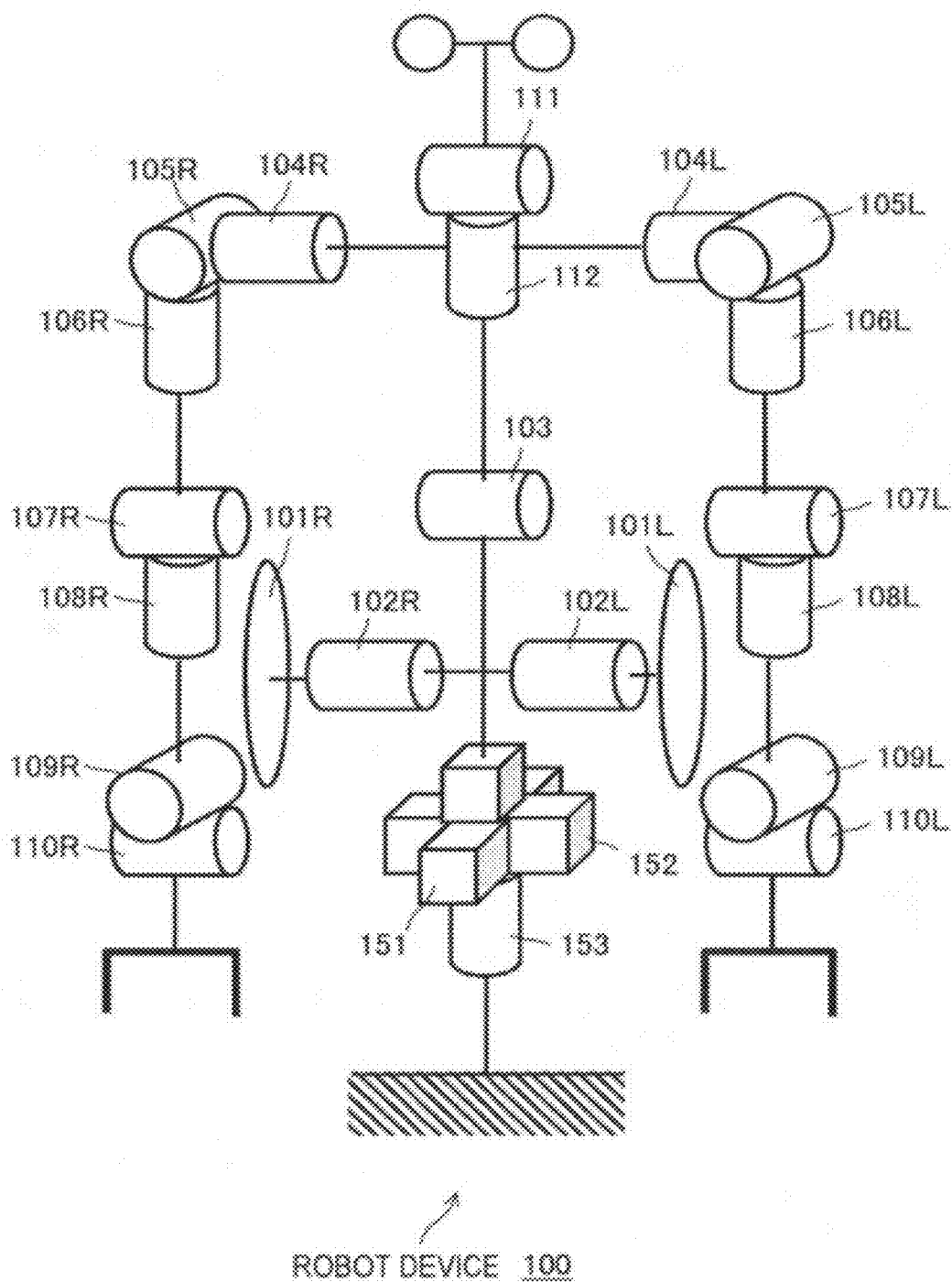
FIG. 2 is a diagram schematically illustrating a joint degree-of-freedom configuration of the robot device 100 to which the present technology disclosed in this specification is applicable.

In FIG. 1, the external appearance of a robot device to which the present technology disclosed in this specification is applicable is illustrated. The robot device 100 is a link tectonic belt in which a plurality of links are connected by joints, each of which is operated by an actuator. In FIG. 2, a joint degree-of-freedom configuration of the robot device 100 is schematically illustrated. Although the illustrated robot device 100 mainly installed in a home environment performs household chores or care, the robot device 100 is available for various purposes such as industrial uses.

The illustrated robot device 100 is provided with two drive wheels 101R and 101L facing a base unit as moving means. The drive wheels 101R and 101L are driven by drive-wheel actuators 102R and 102L, each of which rotates around a pitch axis. In FIG. 2, reference numerals 151, 152, and 153 denote non-existent underactuated joints. The joints 151, 152, and 153 correspond to a degree of translational freedom of an X direction (front-back direction) to a floor surface of the robot device 100, a degree of translational freedom of a Y direction (left-right direction), and a degree of rotational freedom around a yaw axis, respectively. The joints 151, 152, and 153 are expressions of moving of the robot device 100 around the virtual world.

The moving means is connected to an upper body via a hip joint. The hip joint is driven by a hip joint axis actuator 103 that rotates around the pitch axis. The upper body is constituted by two limbs including left and right arm portions and a head portion connected via a neck joint. The left and right arm portions each have a total of seven degrees of freedom including three degrees of freedom of a shoulder joint, two degrees of freedom of an elbow joint, and two degrees of freedom of a wrist joint. The three degrees of freedom of the shoulder joint are driven by a shoulder-joint pitch-axis actuator 104R/L, a shoulder-joint roll-axis actuator 105R/L, and a shoulder-joint yaw-axis actuator 106R/L. The two degrees of freedom of the elbow joint are driven by an elbow-joint pitch-axis actuator 107R/L and an elbow-joint yaw-axis actuator 108R/L. The two degrees of freedom of the wrist joint are driven by a wrist-joint roll-axis actuator 109R/L and a wrist-joint pitch-axis actuator 110R/L. In addition, two degrees of freedom of the neck joint are driven by a neck-joint pitch-axis actuator 111 and a neck-joint yaw-axis actuator 112. In addition, one degree of freedom of a hand joint is driven by a hand-joint roll-axis actuator 113R/L.

Although the illustrated robot device 100 has moving means of two facing wheels, the present technology disclosed in this specification is not limited to the moving means of the two facing wheels. For example, the present technology disclosed in this specification can also be applied to the robot device 100 having leg type moving means.

Figure 3:
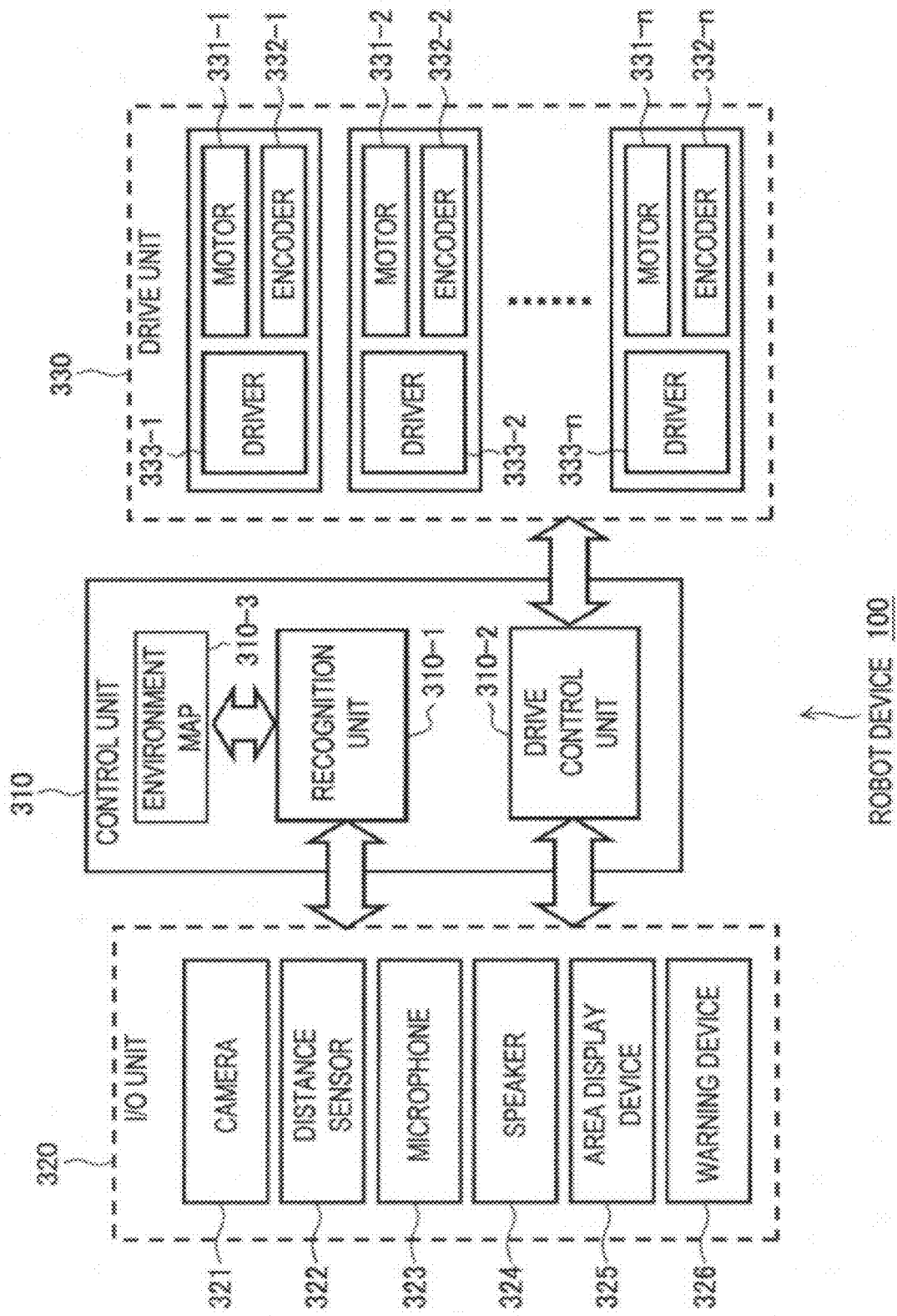
FIG. 3 is a diagram schematically illustrating a functional configuration of the robot device 100 to which the present technology disclosed in this specification is applicable.

FIG. 3 schematically illustrates a functional configuration of the robot device 100. The robot device 100 includes a control unit 310, which performs integrated control of the entire operation or processes data, an input/output (I/O) unit 320, and a drive unit 330. Hereinafter, these units will be described.

The I/O unit 320 includes a camera 321 corresponding to the eye of the robot device 100, a distance sensor 322, which detects a distance to a human or obstacle, a microphone 323 corresponding to the ear of the robot device 100, and the like as input units. The robot device 100 can receive a task instruction by an audio input of a user, for example, from the microphone 323. However, the robot device 100 may have another task-instruction input means (not illustrated) via a wired link, a wireless link, recording media, or the like.

In addition, the I/O unit 320 includes a speaker 324 corresponding to the mouth of the robot device 100, an area display device 325 for specifying a restricted area, a warning device 326 for warning a human or the like entering the restricted area, and the like as output units. The distance sensor 322 is constituted by a space sensor, for example, such as a laser range finder or the like. The area display device 325 is constituted by a laser projector or the like, and used to display a dangerous area as will be described later. The warning device 326 issues a warning by means other than an audio by the speaker 324, and, for example, fires a blank shot, emits a smell a human or the like hates, or outputs hot air.

The drive unit 330 is a functional module for implementing a degree of freedom in each joint of the robot device 100, and is constituted by a plurality of drive units provided for each roll, pitch, or yaw axis in each joint. Each drive unit is constituted by a combination of a motor 331, which performs a rotation operation around a predetermined axis, an encoder 332, which detects a rotation position of the motor 331, and a driver 333, which adaptively controls a rotation position or a rotation speed of the motor 331 on the basis of the output of the encoder 332.

The control unit 310 includes a recognition unit 310-1, a drive control unit 320-2, and an environment map 310-3.

The recognition unit 310-1 recognizes a surrounding environment on the basis of information obtained from the input unit such as the camera 321 or the distance sensor 322 within the I/O unit 320. For example, the recognition unit 310-1 pre-constructs the environment map 310-3 on the basis of the input information. In addition, the recognition unit 310-1 determines an autonomous moving object of a human or the like from temporal variation of the environment map 310-3.

The drive control unit 310-2 controls the output unit of the I/O unit 320 or the drive of the drive unit 330. For example, the drive control unit 310-2 controls the drive unit 330 for enabling the robot device 100 to implement tasks such as household chores or care according to an instruction. In addition, if a restricted area of a human or the like is calculated on the basis of action prediction in the task, the drive control unit 310-2 causes the area display device 325 to display the restricted area. In addition, the drive control unit 310-2 causes the warning device 326 to issue a warning when the position of the autonomous moving object such as the human or the like recognized by the recognition unit 310-1 overlaps the restricted area.

Next, methods of efficient safety measures for enabling the robot device 100 to implement the co-existence with humans and the like (including adults, children, and pets) within the home environment and the like will be described.

As compared to the industrial robot, the household robot has a feature in that a task according to an instruction from the user is done without performing a predetermined iteration operation. In addition, in the household robot, action constantly varies with a task according to an instruction, and a movable range, which should serve as a restricted area of humans and the like, varies. Thus, it is difficult to install a barrier in a work area for safety measures as in the industrial robots.

In the robot device 100 according to this embodiment, the recognition unit 310-1 constructs the environment map 310-3 on the basis of information obtained from the input unit such as the camera 321 or the distance sensor 322 of the I/O unit 320. The recognition unit 310-1 constantly detects a positional relationship of a human or the like on the environment map 310-3, and determines an autonomous moving object such as a human or the like from temporal variation of the environment map 310-3.

In addition, the robot device 100 according to this embodiment takes safety measures by specifying a predicted restricted area by the area display device 325 for every task and urging the human or the like not to enter the restricted area.

Further, when the position of the autonomous moving object such as the human or the like overlaps the restricted area, the robot device 100 according to this embodiment secures an appropriate work area within the home environment by causing the warning device 326 to issue a warning and actively guiding the human or the like outside the area.

Figure 4:
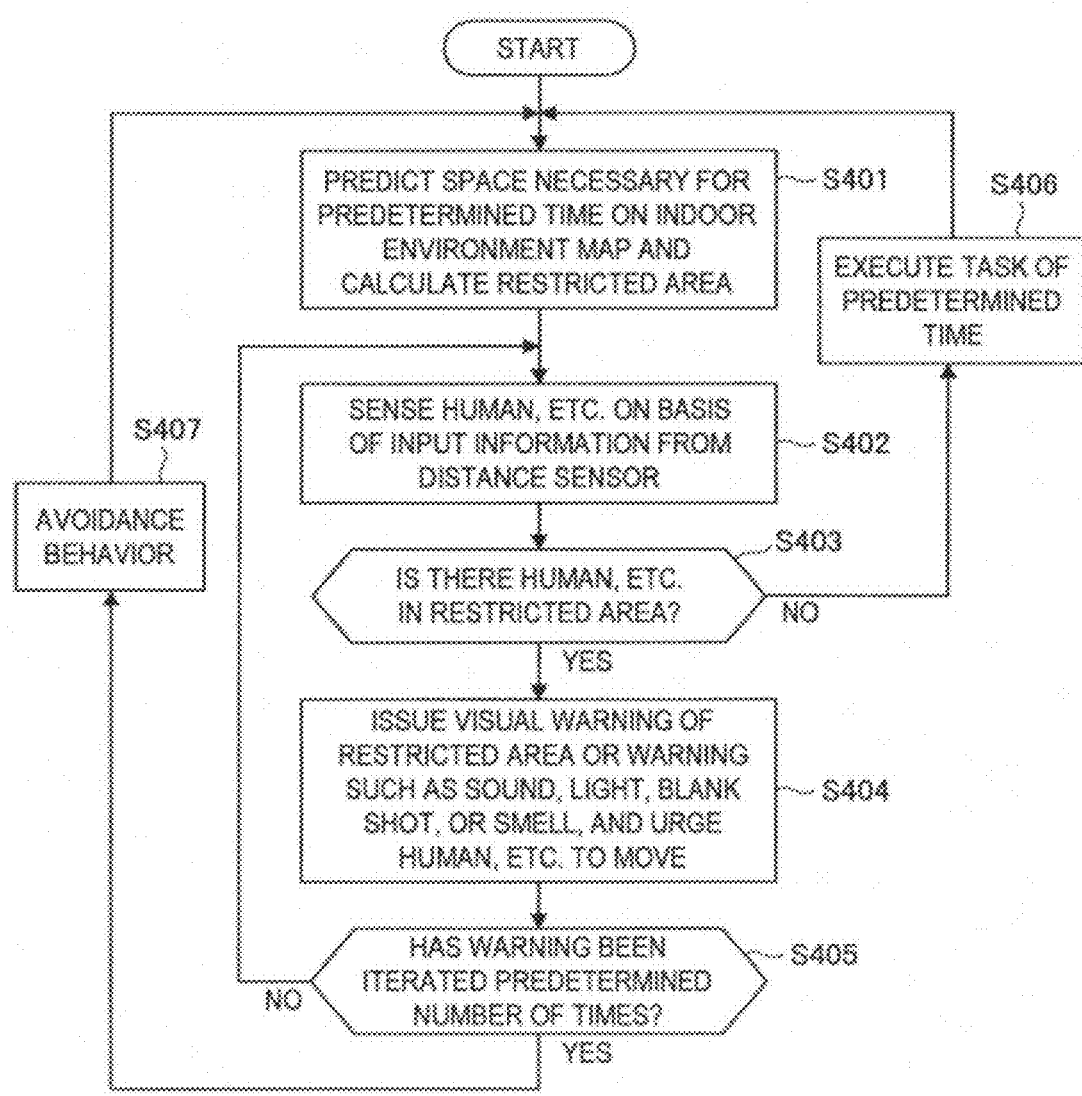
FIG. 4 is a flowchart illustrating a processing procedure when the robot device 100 executes a task according to an instruction.

In FIG. 4, a processing procedure when the robot device 100 executes a task according to an instruction is illustrated in the form of a flowchart.

If the processing procedure is started by receiving an instruction of the task, the robot device 100 first calculates a restricted area by predicting a space necessary for a predetermined time when the task is executed according to the instruction on the indoor environment map 310-3 in which the robot device 100 is installed (step S401). The restricted area corresponds to a work area assumed from an arm position or the like in a task to be executed by the robot device 100 or an area in which a margin is further added to the work area.

Then, a human or the like is sensed on the environment map 310-3 on the basis of the input information from the distance sensor 322 or the like (step S402).

Then, it is checked whether the human or the like sensed in step S402 is located in the restricted area calculated in step S401 (step S403).

Here, when there is no human in the restricted area (No of step S403), the robot device 100 executes a task for a predetermined time by controlling the drive of the drive unit 330 by the drive control unit 310-2 (step S406). Thereafter, the robot device 100 returns to the process of step S401.

Figure 5:
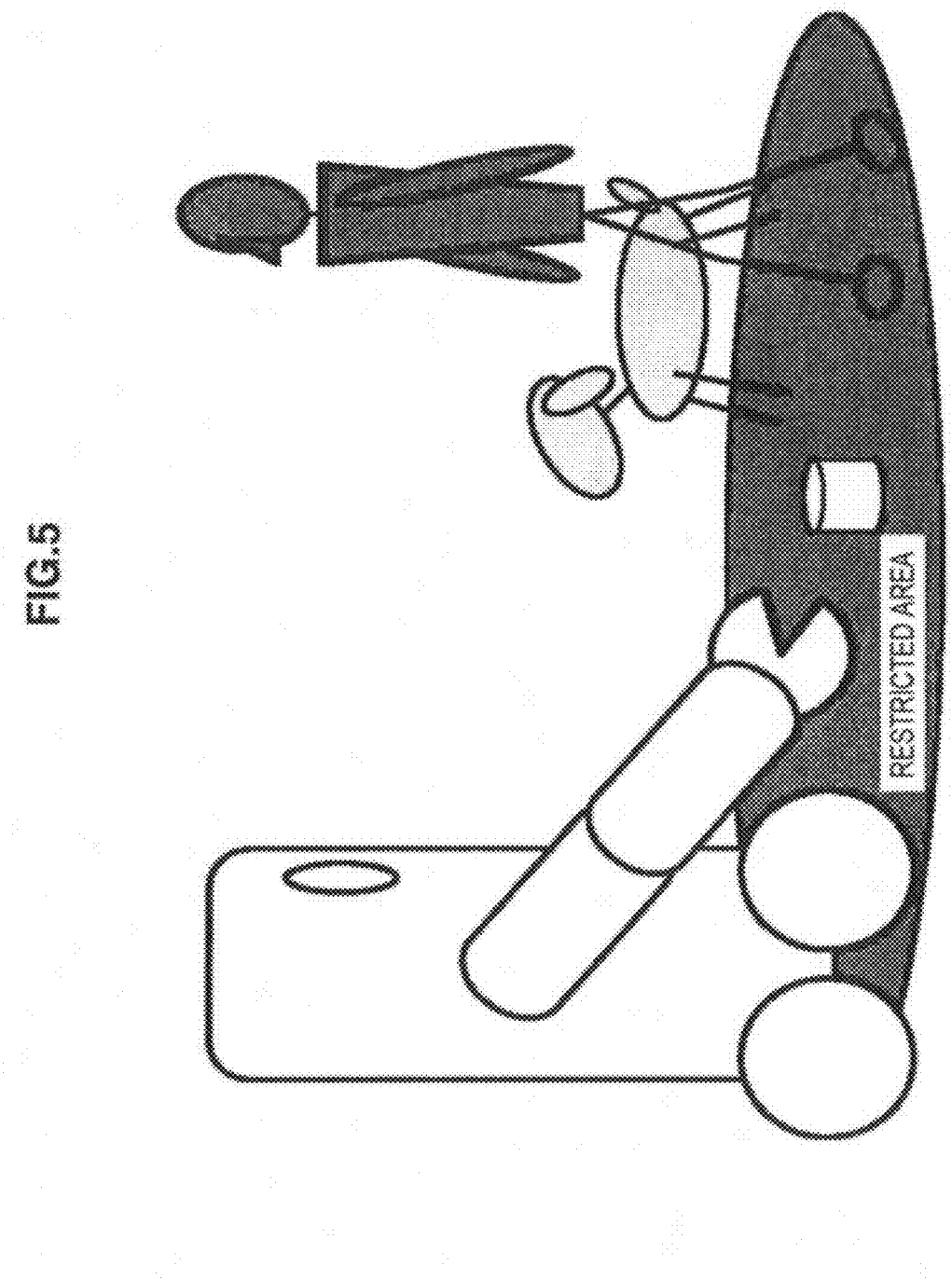
FIG. 5 is a diagram illustrating a state in which the robot device 100 issues a visual warning of a restricted area.
Figure 6:
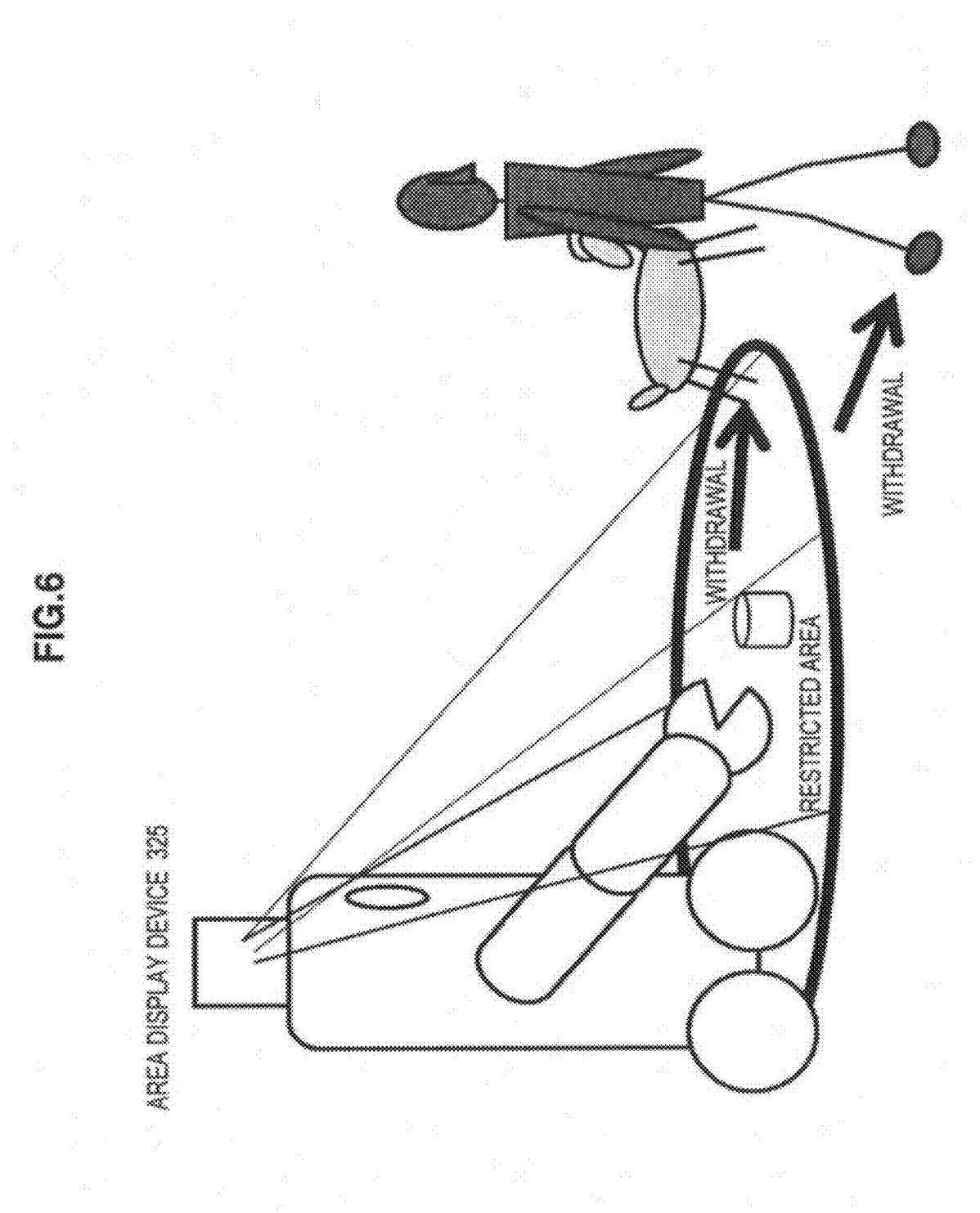
FIG. 6 is a diagram illustrating a state in which a human or the like leaves the restricted area according to the visual warning of the restricted area by the robot device 100.
Figure 7:
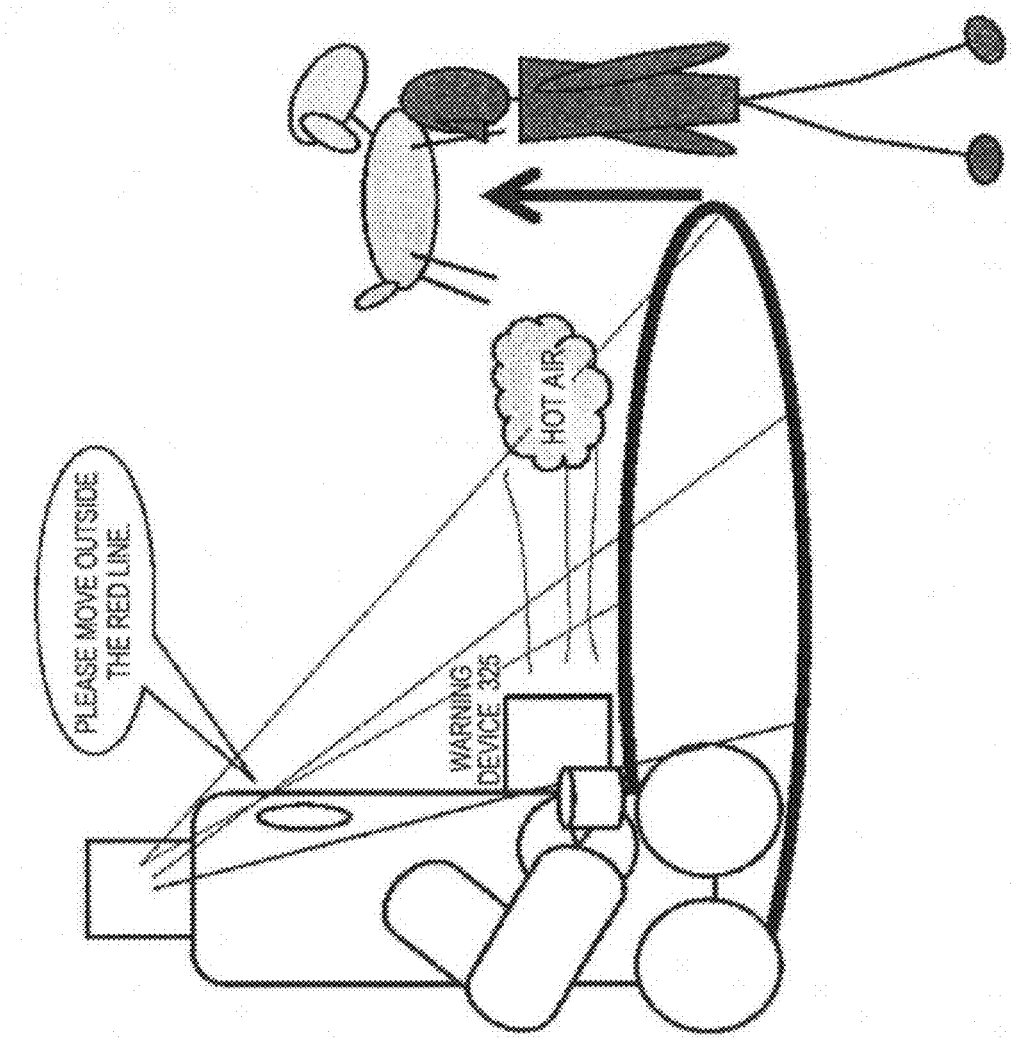
FIG. 7 is a diagram illustrating a state in which a human or the like leaves the restricted area by the robot device 100 outputting hot air from a warning device 326 with an audible warning.

On the other hand, when the human is determined to be present in the restricted area (Yes of step S403), the robot device 100 issues a visual warning of the restricted area by projecting the restricted area by the area display device 325 constituted by a laser projector or the like. In FIG. 5, a state in which the robot device 100 issues the visual warning of the restricted area is illustrated. In addition, FIG. 6 illustrates a state in which the robot device 100 issues a visual warning for urging a human or the like to move from the restricted area and the human or the like leaves the restricted area according to the visual warning. In addition, the robot device 100 issues an audible warning such as an audio or blank shot, which generates an instruction of withdrawal from the restricted area, from the speaker 324. Further, the robot device 100 warns the human or the like to leave the restricted area by emitting a smell the human or the like hates or outputting hot air using the warning device 326 (step S404). FIG. 7 illustrates a state in which the robot device 100 issues an audible warning indicating the message, "Please move outside the red line (projected by the area display device 325)," and causes the human or the like to leave the restricted area by outputting hot air from the warning device 326. In FIG. 7, a warning is issued by a sound, light, blank shot, or smell and urges the human or the like to move in addition to the display of the restricted area illustrated in FIG. 6. The robot device 100 iterates the above-described warning a predetermined number of times by returning to step S402 until the human or the like leaves the restricted area (No of step S405).

When the robot device 100 does not secure the safety as in the case where the human or the like does not leave the restricted area even when the warning is iterated a predetermined number of times (Yes of step S405), the robot device 100 takes its own avoidance action so that the human or the like moves outside the restricted area (step S407). The robot device 100 returns to the process of step S401.

Here, the restricted area calculated in step S401 will be described.

In a task to be executed by the robot device 100 at a current time t, a position of the robot device 100 is assumed to be P(t). When a position (x(t), y(t), z(t)) at a time t of the robot device 100 is expressed, for example, by a cubic spline, the position P(t) at the current time t can be described as shown in the following Expression (1).

$$P(t) = \begin{bmatrix} x(t) \\ y(t) \\ z(t) \end{bmatrix} = \begin{bmatrix} ax \times t^3 + bx \times t^2 + cx \times t + dx \\ ay \times t^3 + by \times t^2 + cy \times t + dx \\ az \times t^3 + bz \times t^2 + cz \times t + dx \end{bmatrix} \quad (1)$$

In addition, in the task to be executed by the robot device 100 at the current time t, the restricted area assumed from an arm position or the like is temporarily considered as a circle of which the center is a main body of the robot device 10, and its radius is set as R(t).

It is necessary to calculate a work area after the passage of a predetermined time from a current time so as to predict a necessary space from action prediction of the robot device 100 that executes a task according to an instruction and display the restricted area.

If the predetermined time set temporarily is te, the restricted area at a time t+te when the predetermined time te has elapsed from the current time t can be expressed by a position P(t+te) of the robot device 100 at the time and a radius R(t+te) of the restricted area at the time.

Figure 8:
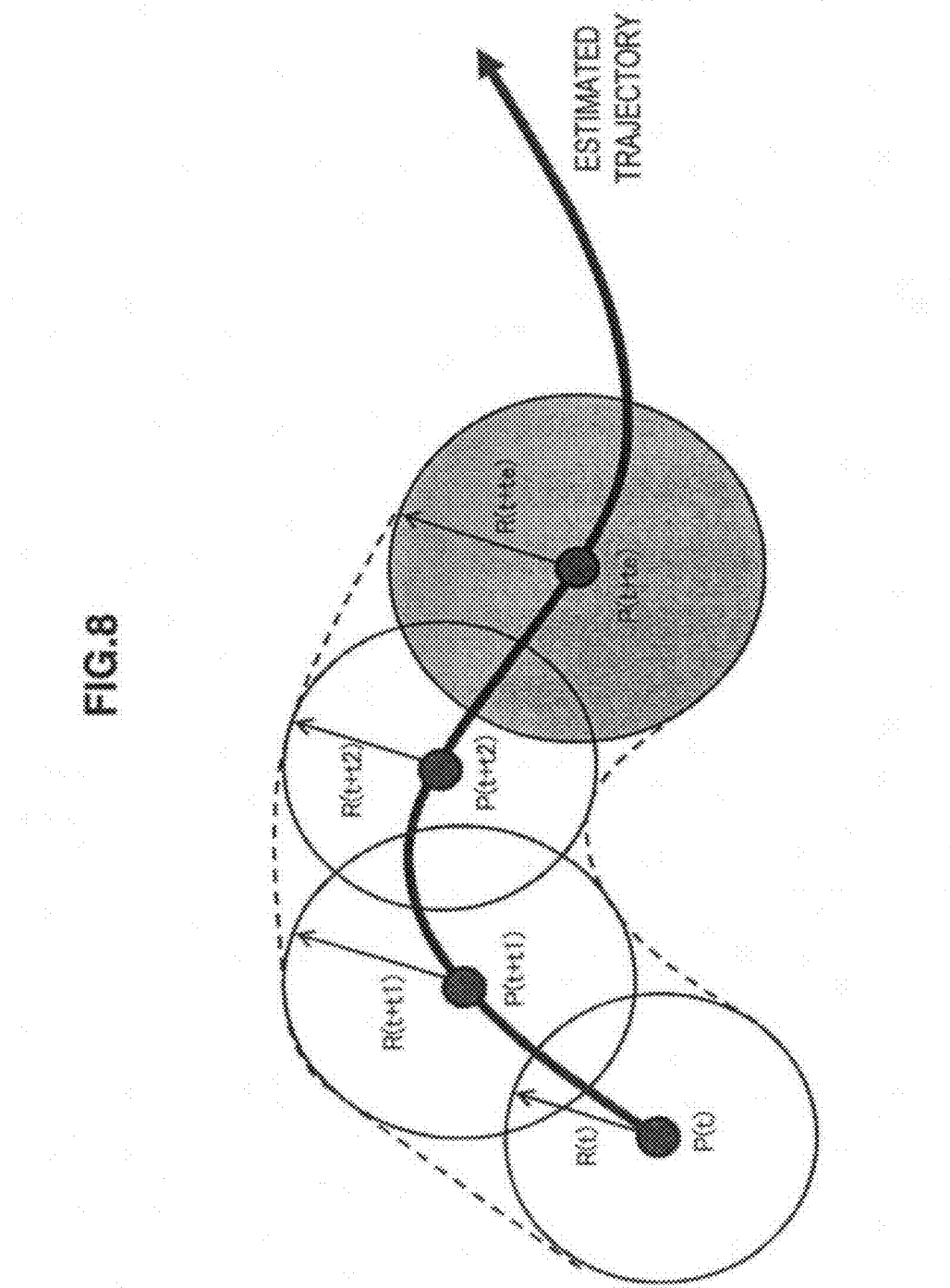
FIG. 8 is a diagram illustrating an estimated trajectory of the robot device 100 and the restricted area at each time.

In FIG. 8, a trajectory based on action prediction of the robot device 100, which performs a task according to an instruction, and a restricted area at each time are illustrated. However, the restricted area is temporarily considered as a circle of which the center is a main body of the robot device 100. In the same drawing, the restricted area at the time t+te is displayed in gray. Although the radius of the restricted area at each time varies according to a task in execution, the radius may be handled to be constant for convenience of a calculation.

An area where the robot device 100 moves from the current time t to the time t+te when the predetermined time te has elapsed becomes a necessary work area. Thus, the restricted area is set by dividing the predetermined time te from the current time t into several steps and continuously connecting a necessary work area of each step.

In this calculation, a calculation amount capable of being processed may also be adjusted according to the performance of hardware provided in the control unit 310 of the robot device 100. Thus, the calculation of the restriction area may be approximated by adjusting the number of steps for the predetermined time te according to the performance of hardware.

In the example illustrated in FIG. 8, the predetermined time te from the current time is broken down into three steps of times t1, t2, and te. Therefore, a finally necessary restricted area is obtained by approximately connecting restricted areas calculated as radiuses R(t), R(t+t1), R(t+t2), and R(t+te) in positions of the robot device 100 at times t, t+t1, t+t2, and t+te as indicated by the dotted line.

As described above, the robot device 100 according to this embodiment can take appropriate safety measures within a home environment when a task is performed according to an instruction.

In addition, the robot device 100 according to this embodiment can specify a subsequent restricted area predicted for each task and urge a human or the like to move.

In addition, the robot device 100 according to this embodiment can narrow down the restricted area to an appropriate restricted area by adjusting a predetermined time for each task.

In addition, the robot device 100 according to this embodiment can guide a human or the like entering the restricted area outside the area through a warning.

In addition, the robot device 100 according to this embodiment enables a task to be seamlessly continued by physically guiding a human's approach.

In addition, because the robot device 100 according to this embodiment limits a specified restricted area to only a dangerous area of a task to be currently executed, an influence of the restricted area on a home environment is reduced.

The technology disclosed in this specification can have the following configuration.

(1) A robot device includes a drive unit including a plurality of links and joints connecting the links; a task instruction input unit for inputting an instruction of a task; a drive control unit for controlling an operation of the drive unit on the basis of the input task and determining a restricted area including a space necessary for the operation of the drive unit; and an area display unit for displaying the restricted area.

(2) In the robot device according to (1), the drive control unit predicts a space necessary for a predetermined time so as to implement the input task, and determines the restricted area based on the prediction result.

(3) In the robot device according to (2), the drive unit further includes a moving unit for moving a position of the robot device, and the drive control unit predicts a space necessary at a moving position at each time until the predetermined time has elapsed, and determines the restricted area based on a prediction result.

(4) The robot device according to any one of (1) to (3) further includes: a recognition unit for recognizing a human or obstacle within a work environment, wherein the area display unit displays the restricted area when the human or obstacle recognized by the recognition unit is located within the restricted area.

(5) The robot device according to (1) further includes a recognition unit for recognizing a human or obstacle within a work environment, wherein the drive control unit causes the drive unit to operate on the basis of the input task until after a certain time has elapsed when the human or obstacle recognized by the recognition unit is not located within the restricted area.

(6) The robot device according to any one of (1) to (3) further includes: a recognition unit for recognizing a human or animal within a work environment; and a warning unit for issuing a warning so that the human or animal recognized by the recognition unit leaves the restricted area when the human or animal is located within the restricted area.

(7) In the robot device according to (6), the warning unit issues the warning using one of a message audio output, blank shot, smell, and hot air or a combination of two or more thereof.

(8) A method of controlling a robot device includes: inputting an instruction of a task; controlling an operation of a drive unit, of the robot device, including a plurality of links and joints connecting the links on the basis of the input task; determining a restricted area including a space necessary for the operation of the drive unit; and displaying the restricted area.

(9) A robot device control program causes a robot device to be driven as: a task instruction input unit for inputting an instruction of a task; a control unit for controlling an operation of a drive unit, of the robot device, including a plurality of links and joints connecting the links on the basis of the input task; a restricted area determination unit for determining a restricted area including a space necessary for the operation of the drive unit; and an area display unit for displaying the restricted area.

It should be understood by those skilled in the art that various modifications, combinations, sub-combinations and alterations may occur depending on design requirements and other factors insofar as they are within the scope of the appended claims or the equivalents thereof.

Although the embodiments applied to the robot device with two facing wheels have been mainly described in this specification, the subject matter of the technology disclosed in this specification is not limited thereto. The present technology can also be equally applied to a robot device with other moving means or with no moving means.

In addition, the embodiments related to the household robot have mainly been described. Of course, the present technology can also be equally applied to robot devices for various purposes including industrial robots.

Namely, the present disclosure is merely an example, and should by no means be interpreted as limiting the content disclosed in this specification. The subject matter of the present disclosure is to be discerned while taking into consideration the claims.

The present disclosure contains subject matter related to that disclosed in Japanese Priority Patent Application JP 2011-105514 filed in the Japan Patent Office on May 10, 2011, the entire content of which is hereby incorporated by reference.

What is claimed is:

1. A robot device, comprising:
    a drive unit including a plurality of links and joints connecting the plurality of links;
    a task instruction input interface configured to receive an instruction of a task to be executed;
    one or more processors configured to:
        control an operation of the drive unit based on the received instruction of the task;
        predict a trajectory of the robot device in accordance with the received instruction of the task for a determined time period, wherein the determined time period includes a plurality of predetermined time intervals;
        calculate, at each position of the robot device that corresponds to a respective time interval, a restricted area in which the robot device is configured to perform the task based on the received instructions as the robot device moves for the determined time period along the trajectory; and
        determine an operation space along the predicted trajectory by connecting each calculated restricted area that corresponds to a respective time interval so that each calculated restricted area partially overlaps an adjacent calculated restricted area;
    a recognizer, including at least an image sensor or a distance sensor, wherein the recognizer is configured to recognize an obstacle located within a particular calculated restricted area; and
    an area display unit configured to display the particular calculated restricted area when the obstacle is recognized within the particular calculated restricted area.

2. The robot device according to claim 1, wherein the drive unit is configured to change a position of the robot device.

3. The robot device according to claim 1,
    wherein the recognizer is configured to recognize the obstacle within the particular calculated restricted area, and
    wherein the one or more processors are configured to cause the drive unit to operate based on the received instruction of the task after the obstacle recognized by the recognizer moves outside the particular calculated restricted area.

4. The robot device according to claim 1,
    wherein the one or more processors are further configured to issue a warning in an event the obstacle is located within the particular calculated restricted area.

5. The robot device according to claim 4, wherein the one or more processors are further configured to issue the warning using one or more of an audio output message, blank shot, smell, or hot air.

6. A method, comprising:
    receiving an instruction of a task to be executed by a robot device;
    controlling an operation of a drive unit of the robot device based on the received instruction of the task,
        wherein the drive unit includes a plurality of links and joints connecting the plurality of links;
    predicting a trajectory of the robot device in accordance with the received instruction of the task for a determined time period, wherein the determined time period includes a plurality of predetermined time intervals;
    calculating, at each position of the robot device that corresponds to a respective time interval, a restricted area in which the robot device is configured to perform the task based on the received instructions as the robot device moves for the determined time period along the trajectory;
    determining an operation space along the predicted trajectory by connecting each calculated restricted area that corresponds to a respective time interval so that each calculated restricted area partially overlaps an adjacent calculated restricted area;
    recognizing an obstacle located within a particular calculated restricted area by at least an image sensor or a distance sensor; and
    displaying the particular calculated restricted area when the obstacle is recognized within the particular calculated restricted area.

7. A non-transitory computer readable medium having stored thereon, computer-executable instructions for causing the computer to execute operations, comprising:
    receiving an instruction of a task to be executed by a robot device;
    controlling an operation of a drive unit of the robot device based on the received instruction of the task,
        wherein the drive unit includes a plurality of links and joints connecting the plurality of links;
    predicting a trajectory of the robot device in accordance with the received instruction of the task for a determined time period, wherein the determined time period includes a plurality of predetermined time intervals;

calculating, at each position of the robot device that corresponds to a respective time interval, a restricted area in which the robot device is configured to perform the task based on the received instructions as the robot device moves for the determined time period along the trajectory;

determining an operation space along the predicted trajectory by connecting each calculated restricted area that corresponds to a respective time interval so that each calculated restricted area partially overlaps an adjacent calculated restricted area;

recognizing an obstacle located within a particular calculated restricted area by at least an image sensor or a distance sensor; and displaying the particular calculated restricted area when the obstacle is recognized within the particular calculated restricted area.

8. The robot device according to claim 1, wherein the one or more processors are further configured to iterate a warning until the obstacle leaves the particular calculated restricted area.

9. The robot device according to claim 1, wherein the particular calculated restricted area is considered as a circle with the robot device at a center of the circle,
wherein a radius of the circle varies in accordance with the received instruction of the task.

10. The robot device according to claim 1, wherein the one or more processors are configured to issue a warning in an event the obstacle is located within the particular calculated restricted area, wherein the warning comprises a visual warning corresponding to the particular calculated restricted area.

11. The robot device according to claim 10, wherein the one or more processors are configured to issue the warning in an event a position of the obstacle overlaps the particular calculated restricted area.

* * * * *